UNITED STATES PATENT OFFICE.

LOUIS F. JOHNSON, OF CHICAGO, ILLINOIS, ASSIGNOR TO PAUL DICKINSON, OF CHICAGO, ILLINOIS.

COMPOSITION OF MATTER.

No. 827,977.     Specification of Letters Patent.     Patented Aug. 7, 1906.

Application filed January 10, 1906. Serial No. 295,501.

*To all whom it may concern:*

Be it known that I, LOUIS F. JOHNSON, a citizen of the United States, residing at Chicago, in the county of Cook and State of Illinois, have invented a new and useful Improved Composition of Matter, of which the following is a specification.

My invention relates to a new and improved composition of matter which may be employed with benefit for various uses and possesses the advantage of being a particularly efficient and desirable friction material which may be employed, for example, as a brake-shoe facing or insert.

In the manufacture of my improved material I employ the following ingredients in substantially the proportions named, reckoned by bulk: hard-coal cinders, three parts; asbestos pulp, two parts; rock-salt, one part; fresh eucalyptus wood-pulp, three parts; cement, one part; sulfate of magnesia, one part; creosote, two parts.

I prefer to provide the hard-coal cinders in granular form approximating a three-sixteenths mesh. The cinders, asbestos, salt, wood-pulp, and cement are thoroughly mixed together in the proportions stated. The sulfate of magnesia and creosote, in the proportions named, are then thoroughly mixed together in water sufficient to produce a saturated solution of the said ingredients, which solution is poured into and thoroughly mixed with the first mixture to produce a plastic mass capable of being readily molded.

The molding or shaping of the material into blocks or the like is preferably performed under more or less great pressure in any suitable manner.

The resultant material or composition of matter is incombustible, is unaffected by acids, is waterproof, has a high wearing quality, and is similar in many respects to petrified wood. It is an excellent abrasive material and particularly well adapted for use as friction material. While thus far I have produced the best results by providing the aforesaid ingredients in the proportions by bulk named, naturally the proportions may be varied to suit particular cases. Other desirable wood-pulp may be substituted for eucalyptus.

What I claim as new, and desire to secure by Letters Patent, is—

1. The herein-described composition of matter consisting of granulated cinder, asbestos pulp, salt, wood-pulp, cement, sulfate of magnesia and creosote combined in substantially the proportions stated.

2. The herein-described composition of matter, for friction-blocks, consisting of granulated cinder, asbestos, salt, wood-pulp, cement, sulfate of magnesia and creosote combined in substantially the proportions stated, compressed into form and dried.

LOUIS F. JOHNSON.

In presence of—
J. H. LANDES,
L. HEISLAR.